(12) United States Patent
Abbas

(10) Patent No.: US 10,078,801 B2
(45) Date of Patent: Sep. 18, 2018

(54) SYSTEM, METHOD AND SOFTWARE FOR REPRESENTING DECISION TREES

(71) Applicant: Ali Abbas, Los Angeles, CA (US)

(72) Inventor: Ali Abbas, Los Angeles, CA (US)

(73) Assignee: Ali Abbas, Los Angeles, CA (US)

( * ) Notice: Subject to any disclaimer, the term of this patent is extended or adjusted under 35 U.S.C. 154(b) by 337 days.

(21) Appl. No.: 14/845,250

(22) Filed: Sep. 3, 2015

(65) Prior Publication Data

US 2017/0068893 A1    Mar. 9, 2017

(51) Int. Cl.
*G06F 17/30*    (2006.01)
*G06N 5/02*    (2006.01)
*G06Q 30/02*    (2012.01)

(52) U.S. Cl.
CPC ........... *G06N 5/02* (2013.01); *G06Q 30/0201* (2013.01)

(58) Field of Classification Search
CPC .............................. G06N 5/02; G06Q 30/0201
USPC .......................................................... 706/46
See application file for complete search history.

(56) References Cited

U.S. PATENT DOCUMENTS

| | | | | | |
|---|---|---|---|---|---|
| 4,710,763 | A | * | 12/1987 | Franke | G06F 3/0481 345/10 |
| 5,608,898 | A | * | 3/1997 | Turpin | G06F 8/34 |
| 5,787,274 | A | * | 7/1998 | Agrawal | G06F 17/30705 |
| 6,247,016 | B1 | * | 6/2001 | Rastogi | G06F 17/30598 |
| 6,411,957 | B1 | * | 6/2002 | Dijkstra | G06F 17/30961 707/752 |
| 7,062,504 | B2 | * | 6/2006 | Cantu-Paz | G06K 9/6282 706/20 |
| 8,065,326 | B2 | * | 11/2011 | Li | G06F 17/30539 707/776 |
| 8,412,656 | B1 | * | 4/2013 | Baboo | G06Q 30/0201 706/20 |
| 8,429,525 | B2 | * | 4/2013 | Simonyi | G06F 8/10 715/229 |
| 9,171,255 | B2 | * | 10/2015 | Abbas | G06N 5/02 |
| 2003/0187875 | A1 | * | 10/2003 | Nakase | G06F 17/18 |
| 2003/0229630 | A1 | * | 12/2003 | Kamath | G06K 9/6282 |
| 2005/0097453 | A1 | * | 5/2005 | Simonyi | G06F 8/10 715/234 |
| 2006/0218169 | A1 | * | 9/2006 | Steinberg | G06F 17/30598 |
| 2008/0052298 | A1 | * | 2/2008 | Yeh | G06F 17/30908 |
| 2012/0066410 | A1 | * | 3/2012 | Stefanakis | H04L 45/00 709/245 |
| 2014/0019389 | A1 | * | 1/2014 | Abbas | G06N 5/02 706/12 |

* cited by examiner

*Primary Examiner* — Sheree N Brown

(57) ABSTRACT

A method for representing decision trees that avoids the common problem of congestion and overlapping of the nodes in the tree. This problem has traditionally limited the number of nodes and uncertainties that can be represented using decision trees. The approach provides a method and formulation for plotting the coordinates of the decision tree in a way that avoids the problem of congestion of the nodes by drawing the tree in reverse chronological order.

3 Claims, 5 Drawing Sheets

Figure 1 (Amended by including "Prior Art")

Horizontal distance
of stage is uniform.

Vertical distance between
End nodes is uniform.

SYSTEM, METHOD AND SOFTWARE FOR REPRESENTING DECISION TREES

BACKGROUND OF THE INVENTION

Decision trees are graphical representations of a decision situation. They play a crucial role in both the representation and the analysis of decision problems. The main building blocks of a decision tree representation include (i) the decisions that need to be made (and the set of possible alternatives for each decision); (ii) the uncertainties present in the decision (and the set of possible outcomes for each uncertainty), and (iii) the set of possible consequences of the decision and their values (presented at the end of the tree). The decision tree is drawn from left to right in the chronological order of encountering the decisions, uncertainties and the possible consequences.

Using a decision tree (i) a decision is represented by a "decision object", which is a square or a rectangle at the vertex of the object, from which branches representing the set of alternatives corresponding to that decision emanate; (ii) an uncertainty is represented by an "uncertainty object", which is a circle or an oval at the vertex of the object, from which branches representing the possible outcomes of that uncertainty emanate, and (iii) the consequences of the decision, represented as end nodes of the tree, and given a triangular symbol. The decision tree is drawn from left to right to represent the chronological order of encountering the decisions, uncertainties and the possible consequences. An example of a decision tree is shown in FIG. 1. Decisions and uncertainties to the left precede (chronologically) decisions and uncertainties to the right. For example, the tree in FIG. 1 depicts a firm's decision of whether or not to introduce a new product, followed by an uncertainty about whether the competitor would introduce a competitive product in response, followed by a second decision that the firm might decide upon, which is the price for its product, and then finally an uncertainty about the competitor's price in response to their pricing decision.

The result of drawing the tree from left to right is that the size of each object (whether a decision object or an uncertainty object) is decided upon in advance before completing the tree. Note in FIG. 1 that the spacing between the branches in each object are equal, but the result is that the spacing between the consequences at the end of the tree is not uniform. Furthermore, with the current state-of-the-art, it is difficult to add more uncertainties and nodes to the end of the tree because the nodes will overlap. Furthermore, the tree is already drawn at this stage, so any attempts to increase the spacing will require redrawing the tree. But even if that is done, the congestion problem will persist as more decisions and uncertainties are added. This is a major limitation for the number of uncertainties and decisions that can be modeled and analyzed in a given decision situation.

Most complex decision situations we encounter today include multiple decision points and multiple uncertainties. Therefore it is important to have a method that can represent decision trees without congestion at the end of the tree, and that can incorporate any number of decisions and uncertainties.

Because of the advancements in scientific computing, decision trees have been embedded in numerous software packages and on many internet platforms. All of these software packages draw the tree in chronological order from left to right. Software packages that draw decision trees are known to have the following problems:

(i) The tree is often difficult to read because the branches are squeezed due to overlap and non-uniform spacing.
(ii) Branches and nodes overlap when the tree is scaled beyond a few decisions or uncertainties.

Because of these reasons, it is difficult to model decisions using a decision tree beyond a few nodes when the tree is drawn in chronological order (from left to right), and the representation is not scalable. To overcome these problems, some software packages attempt to draw decision nodes and uncertainty nodes with very large spacing to minimize the overlap, but this makes the representation very inefficient in terms of space, particularly for large-size problems.

Because of the importance of decision trees in the analysis of decision problems, and because of the limitations in the current system of representation, there is an urgent need to provide an automated representation of decision trees that is both scalable (where the nodes do not overlap) and clear for users to read.

The proposed invention addresses this problem by drawing the tree at each stage from right to left (reverse chronological order) instead of from left to right (chronological order).

FIGS. 2-5 show examples of the proposed approach with uniform spacing at the end nodes by drawing the tree from right to left. The figures also show that the length of the horizontal branches in each stage of the tree is uniform, making the tree easy to read.

SUMMARY OF THE INVENTION

The invention provides a method to represent decision trees with non-overlapping nodes. An aspect of the invention draws the tree from right to left (reverse chronological order) instead of chronological order. Another aspect of the invention involved uniform vertical spacing between the end nodes and/or uniform horizontal spacing between the different stages. This allows for scalability (both vertical and horizontal), efficiency in size, and readability of the tree. The number of end nodes in the tree is determined by the selection of decisions and uncertainties (as well as their branches). The objects in the tree (decisions and uncertainties) are traced backwards from right to left instead of left to right.

BRIEF DESCRIPTION OF THE DRAWINGS

FIG. 3 shows an example of a decision tree with one decision node drawn from right to left. The decision has three alternatives. The vertical distance between the end nodes is uniform (and can be adjusted by the user). The horizontal distance for the decision (length of branches) is uniform. The position of the square solid vertex is determined by the number of alternatives, as well as the vertical and horizontal distances.

FIG. 4 shows the tree representation using the proposed approach when we add an uncertainty to the tree in FIG. 3. It represents a decision tree with one decision node and one uncertainty node connected to the top alternative. The tree is again drawn from right to left. The vertical distance between the end nodes is uniform (and can be adjusted by the user). The horizontal distance for each stage is uniform (length of branches of the decision and length of branches of the uncertainty). The position of the square solid vertex and circular solid vertex is determined by the number of alternatives, the number of end nodes, the tree configuration, as well as the vertical and horizontal distances.

FIG. 5 shows a decision tree represented using the proposed approach. The figure displays a tree with one decision node; one uncertainty node connected to the top alternative, and a final decision node connected to the top four end nodes of FIG. 4. The tree is drawn from right to left. The vertical distance between the end nodes is uniform (and can be adjusted by the user). The horizontal distance for each stage is uniform (length of branches of the decision and length of branches of the uncertainty). Position of rectangular solid vertex and circular solid vertex is determined by the number of alternatives, the number of end nodes, the tree configuration, as well as the vertical and horizontal distances.

DETAILED DESCRIPTION OF THE INVENTION

The invention provides a method to draw a decision tree in a way that prevents the problem of congestion and overlapping nodes. The approach allows the decision tree representation to be scalable. The invention draws the tree at each stage from right to left in reverse chronological order.

In one aspect of the invention, the tree is represented using a computer. At each stage, a user is given a choice of adding a decision (square or rectangle at the vertex followed by emanating branches representing the alternatives), an uncertainty (oval or circle at the vertex followed by emanating branches representing the outcomes), and a value node at the end of the tree (a triangle).

At each stage, the user clicks on the desired object to be added to the decision tree. The number of end nodes in the tree is determined at each stage following the user's choice. The spacing between these end nodes is uniform and may be decided by the software or the by user (as specified by a vertical scale parameter). For example, the user may specify a vertical spacing between the end nodes as 1/8 inches. The user also has the option to change this parameter for as required. In one aspect of the invention, this vertical spacing parameter may be specified by a sliding bar. The tree is then drawn from right to left and the spacing of each nodes is determined using a particular formula.

Figure 1:
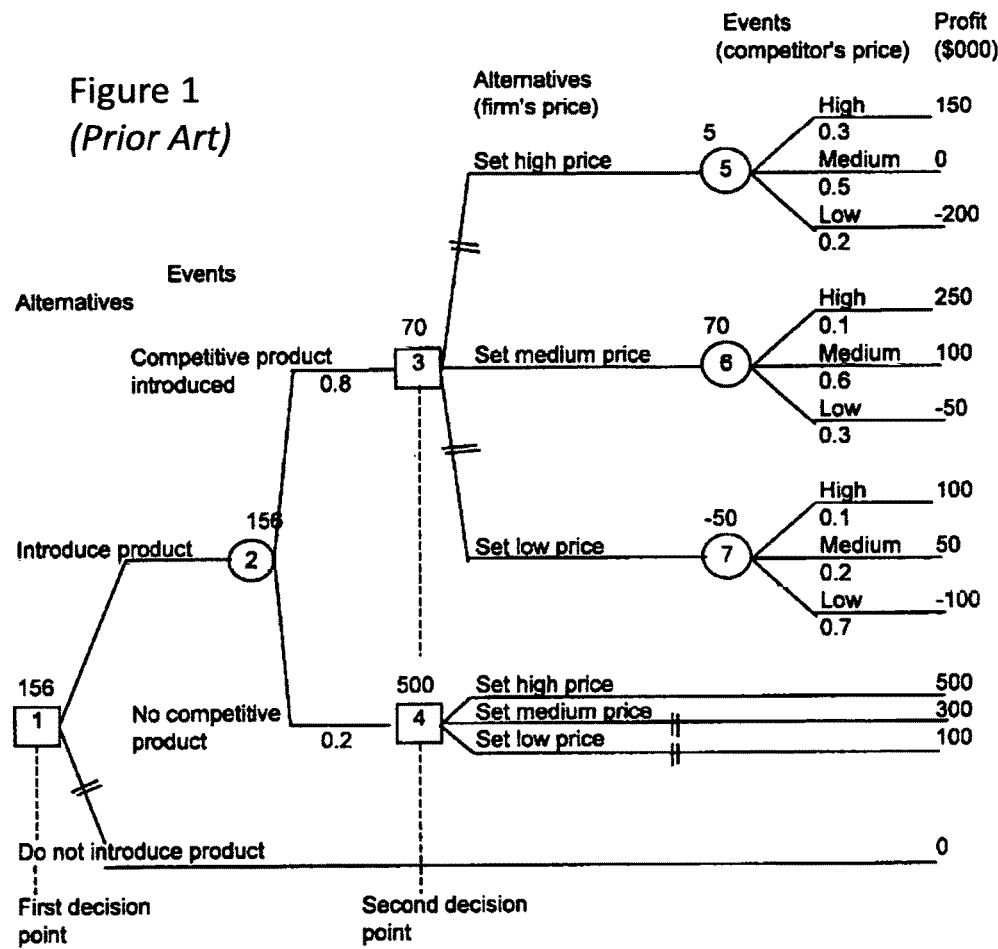
FIG. 1 shows an example of the current method of representing decision trees. The tree is drawn from left to right in the chronological order of encountering the decisions and uncertainties. This results in non-uniform spacing at the end of the tree. It is also difficult to add any more uncertainties or decisions nodes to the tree, without the end nodes overlapping. This limits the number of uncertainties and decisions that can be modeled.
Figure 2:
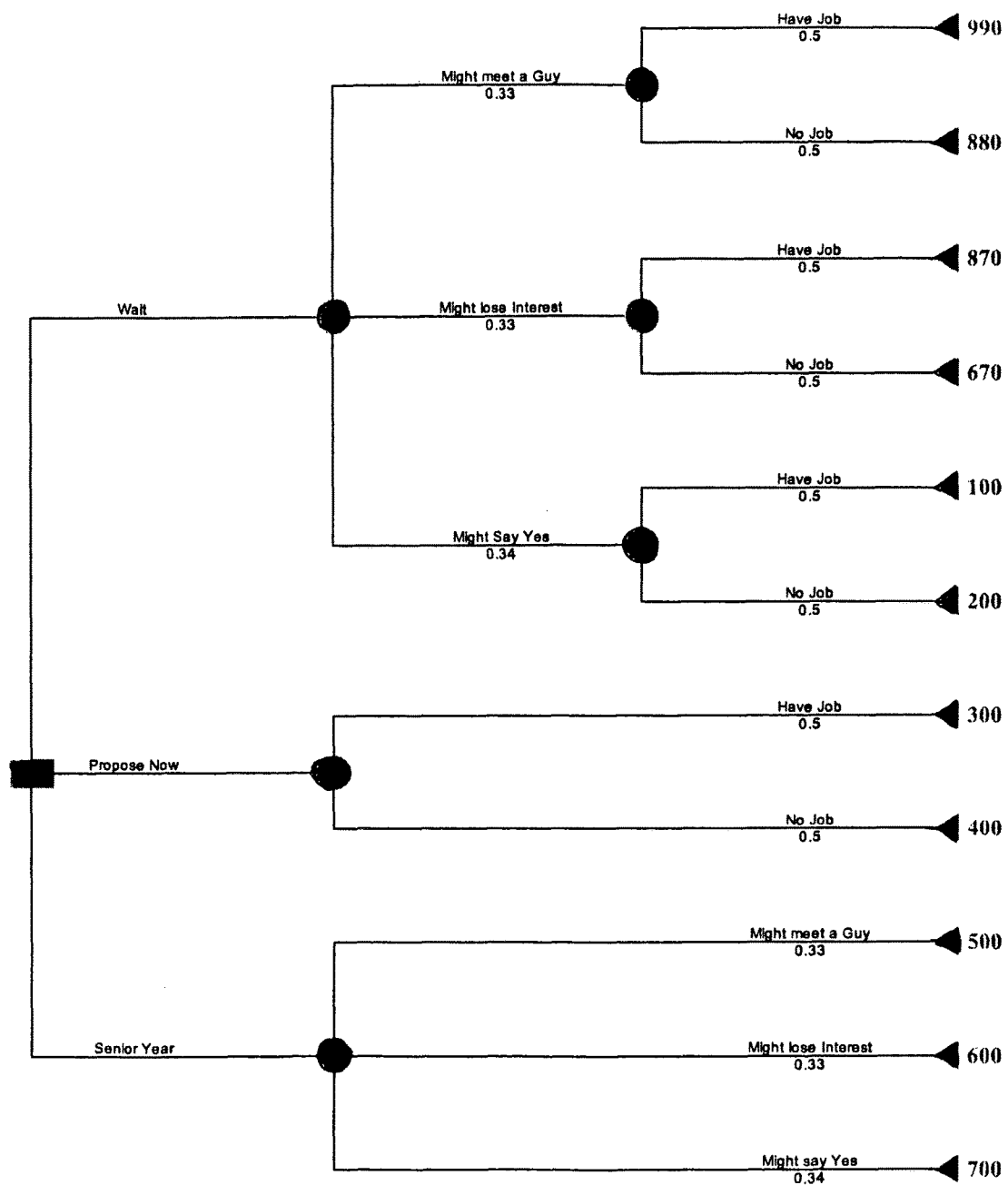
FIG. 2 shows a tree drawn from right to left using the proposed method. The tree is drawn from right to left with uniform spacing between the end nodes. The figure displays a tree with 11 end nodes at the far right of the figure. The vertical spacing between the nodes is equal, and this uniform spacing is decided upon to suit the required vertical scale. The tree is then drawn backwards from right to left starting from the end nodes. The horizontal length of the branch for each stage is determined by a parameter. The figure displays a tree with three stages. The length of the horizontal branch of reach stage is fixed. The result is a clear representation that avoids overlap and congestion in the tree.
Figure 3:
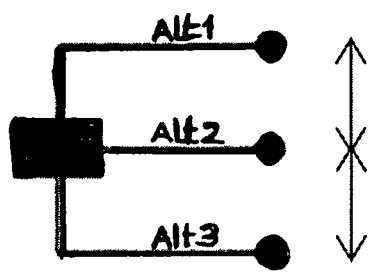
FIG. 3 through 5 show a step-by-step example of the representation while drawing the tree using the proposed approach.

To further illustrate the invention, if a user clicks on a decision node to be added to the tree, the user may be prompted for the names and number of alternatives in this decision. If the user specifies three alternatives for this decision, and if this is the first decision in the tree, then the number of end nodes is three. The tree is then drawn as a decision with three emanating alternatives. The spacing between the alternatives is uniform and can be adjusted by the user. FIG. 3 shows the tree drawn after the first decision.

Suppose now that the user wishes to add another node (like an uncertainty) to the branch corresponding to the top most alternative in the first decision. The user highlights the alternative and then clicks on the uncertainty node. The user may be prompted for the number of outcomes and names of outcomes of the uncertainty. If, for example, the user specifies three outcomes, then the resulting tree will now have five end nodes (three from the added uncertainty and two from the remaining alternatives in the first decision). The uniform spacing between the five end nodes is determined (and can be made adjustable by the user) and tree is drawn from right to left.

Figure 4:
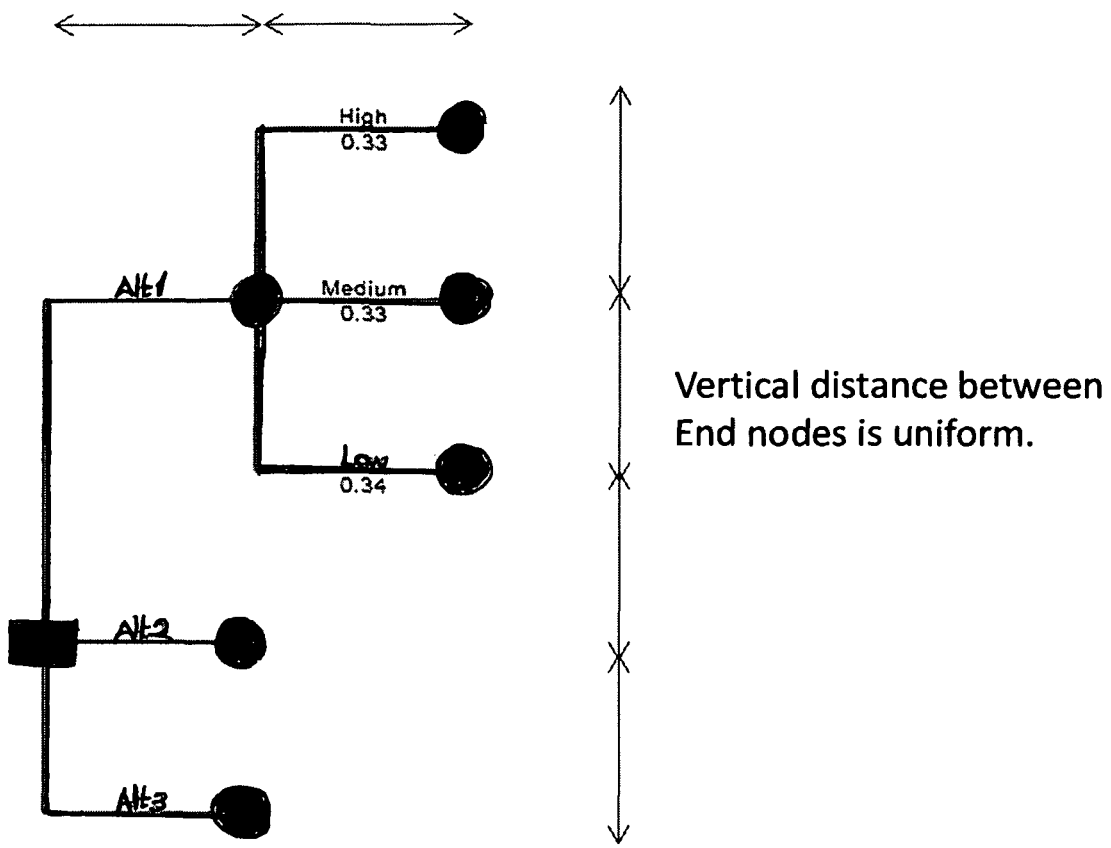

Because the uncertainty was added in the second stage after the decision, the location of the uncertainty is determined first (reverse chronological order). A second spacing parameter is decided upon (and can be adjusted by the user to represent the length of the horizontal branch of each stage (horizontal scaling). The coordinates of the uncertainty node are determined using the top three nodes of the five end nodes. The location of the vertex of the uncertainty node is determined by the uniform spacing between the five nodes (vertical scale) and the length of the stage parameter (horizontal scaling). Finally, the first decision is drawn by three branches connecting the two end nodes and the uncertainty node. FIG. 4 shows the new tree with uniform spacing when the uncertainty has been added. At each stage the user is allowed to change the uniform spacing parameter (vertical scale) and also change the length of the arms for each stage (horizontal scale).

Figure 5:
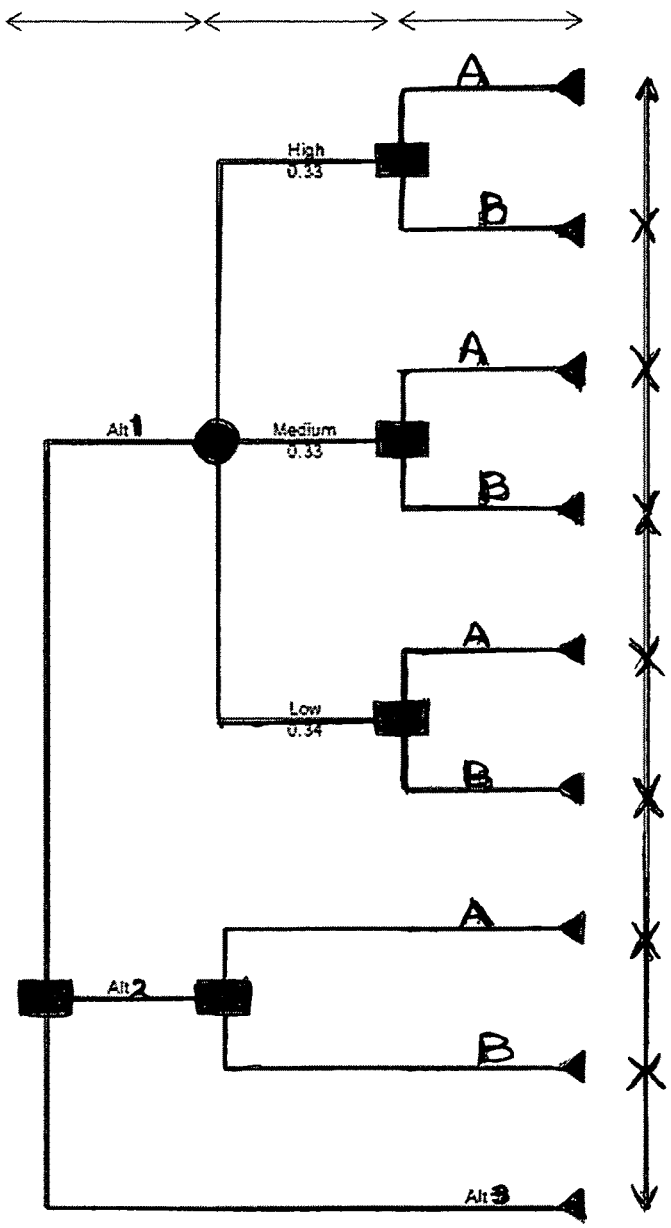

Suppose now, that the user wishes to add a decision node to four of the end nodes. The user highlights the four end nodes. He then clicks on the decision node. He is prompted to enter the names and number of alternatives of the decision. Suppose the user entered 2. The new number of end nodes is calculated as 9 (4×2 plus one from the previous alternative). The tree is now drawn from right to left by specifying the uniform spacing between the end nodes (FIG. 5).

At the end the user may select some or all end nodes and click on value where he will be prompted to enter values (either manually or through a calculation on the nodes).

The number of end nodes of the tree is calculated (as each step of its construction) using the following formula.

The number of end nodes at each step of the tree is equal to:

Number of end nodes in prior step+(Number of nodes selected for the new object)×(number of branches for new object−1)

To illustrate this formula for calculating the number of end nodes, refer to the case where an uncertainty is added to a branch of the decision alternative.

Number of nodes in prior step=3 as shown in FIG. 3.

Number of nodes selected for the new addition=1 (an uncertainty node in FIG. 4)

Number of branches for new addition=3 (the uncertainty has three outcomes in FIG. 4)

Therefore, number of nodes when the uncertainty is added is 3+1×2=5, which is the tree in FIG. 4.

Let us take another example to determine the end nodes in example 5. As we have seen, adding a new decision node after that results in an increased number of nodes. As per the formula:

Number of nodes in prior step=5 as shown in FIG. 4.
Number of nodes selected for the new addition=4 (4 nodes are selected to add a decision node)
Number of branches for new addition=2 (the new decision node has two alternatives)
Therefore, number of nodes when the decision node is added is 4+4×1=9, which is the tree in FIG. 5.

Once the number of end nodes is determined, a uniform spacing parameter is decided to fit the required scale and draw the end nodes of the tree. For example, if the spacing is 1/8 inch, then the nine nodes of FIG. 5 are equally spaced by this distance. The user is given the option to change the 1/8 inch spacing to any other spacing, but the distance between the end nodes will be uniform. This determines the vertical scale of the tree.

The tree is then drawn from right to left by tracing back each node. A horizontal distance, specified by a horizontal parameter, determines the length of each branch of a node from the end of the tree. For example, if the horizontal distance is one inch, then the length of each branch in FIGS. 3, 4 and 5 is one inch. The position of the nodes of Figure three are then determines as follows. The three end nodes have vertices (0,1/8), (0,0), and (0,−1/8). The coordinates of the square node determining the decision are then (−1,0).

As a further demonstration of the formula, the coordinates of the tree in FIG. 5 are calculated as follows. The tree has nine end nodes. It is drawn from right to left with uniform vertical spacing and uniform horizontal spacing. If the vertical spacing is equal to 2/8 inch and the horizontal spacing is equal to one inch, then the coordinates of all points at each stage are as follows.

The right end points have coordinates
(0, 0), (0, 2/8), (0, 4/8), (0, 6/8), (0, 8/8), (0, 10/8), (0, 12/8), (0, 14/8), (0, 16/8)

The coordinate the three square vertices to the left stage of the end nodes are respectively (−1, 15/8), (−1, 11/8), (−1, 7/8)

The coordinates of the circle and square to the left stage of the three square nodes are respectively (−2, 11/8), (−2, 3/8)

Finally, the coordinates of the left square node at the utmost left side of the tree are (−3, 3/8)

Because the tree is drawn from right to left with uniform spacing at the end nodes, the nodes will never overlap regardless of the vertical scale that is used for the end nodes. Moreover, there is no need to start with large spacing at the first nodes because the spacing is automatically determined by the tree structure and the vertical scale. This method allows for a scalable representation of the decision tree and a large number of decisions and uncertainties that can be modeled.

RELATED PATENTS

Decision tree analysis: WO 2004090797 A3 (A method of selecting a decision tree from multiple decision trees includes assigning a Bayesian tree score to each of the decision trees. The Bayesian tree score of each decision tree is compared and a decision tree is selected based on the comparison.)

System and method for generating decision trees: WO 2000065480 A3 (A decision tree clustering procedure is provided which employs a unified approach to extracting both the decision tree and (preferably fuzzy) clusters. The decision tree is built by subsequent clustering of single dimensions or features, and the choice of the winning separation is based on cluster validity. In one embodiment the clustering employs a fuzzy c-means (FCM) model and the partition coefficient (PC) to determine the selected separations.)

Decision Tree Creation and Execution in an Interactive Voice Response System US 20130204834 A1 (Decision trees may be created and executed to manage calls in an interactive voice response (IVR) system. Users may be provided with one or more user interfaces to design, create, and modify decision trees. User may add and edit the rules, logic, and instructions of the decision tree, as well as additional information such as labels, headers, comments, and formatting. One or more decision tree files may be created including the rules, logic, and instructions of the decision tree, which are compatible with an execution engine. One or more decision tree development files also may be created including additional information to be used by a decision tree development application to provide the development environment)

Evaluating decision trees on a GPU U.S. Pat. No. 8,290,882 B2 (Methods and apparatus for evaluating decision trees on a GPU are described. In an embodiment, the structure of a decision tree is converted into a 2D "tree" array with each row representing a node in the tree. Each row comprises details of any child nodes and the parameters which are required to perform the binary test at the node. A pixel shader can then be used to evaluate the decision tree in parallel for each input data point in an input array by navigating through rows in the 2D tree array. For each row, data is read from the input array dependent upon the parameters in the row and the shader moves to another row dependent upon the result of the binary test. On reaching a row which represents a leaf node, the pixel shader outputs evaluation results, such as a leaf node index or a probability distribution over classes).

What is claimed is:
1. A computer-implemented method comprising
constructing, by a processor, a decision tree based upon a decision analysis, the decision tree consists of decision nodes, uncertainty nodes, end nodes, and branches connecting said nodes;
reversing, by a processor, the chronological order of nodes in said decision tree while constructing said tree from right to left in recursive stages starting from a final stage comprising a rightmost stage of said tree, to a first stage comprising a leftmost stage of said tree;
calculating, by a processor, a formula for evaluating a number of end nodes in the final stage of said decision tree based upon a number of decision nodes, a number of uncertainty nodes, a number of alternatives in each decision node, and a number of outcomes in each uncertainty node;
calculating, by a processor, a formula for evaluating a precise location of each end node in the final stage of said decision tree based upon the number of end nodes in the final stage of said tree and a vertical spacing parameter;
calculating, by a processor, a formula for evaluating a precise location of each decision node and each uncertainty node at any stage to the left of the final stage of said tree based upon a number of decision nodes and uncertainty nodes in said stage, a horizontal spacing parameter, a vertical spacing parameter, and a precise location of nodes in a stage immediately to the right of said stage;

selecting, by a processor, coordinates of each node in said decision tree based upon the calculated precise location of each node in said tree, the vertical spacing parameter, and the horizontal spacing parameter;

generating, by a processor, an executable version of said decision tree based upon the selected coordinates of each node in said tree, the alternatives in each decision node, the outcomes in each uncertainty node, a vertical spacing parameter, and a horizontal spacing parameter;

displaying, by a processor, the executable version of said decision tree to a user based upon the decision analysis.

2. The computer implemented method of claim 1, wherein a representation medium is a non-transitory medium or an internet interface.

3. The computer implemented method in claim 1, wherein a vertical spacing parameter is input by a first user and a horizontal spacing parameter is input by a first or a second user.

\* \* \* \* \*